US009959340B2

(12) United States Patent
Li et al.

(10) Patent No.: US 9,959,340 B2
(45) Date of Patent: May 1, 2018

(54) SEMANTIC LEXICON-BASED INPUT METHOD EDITOR

(75) Inventors: Chi-Ho Li, Beijing (CN); Weijiang Xu, Beijing (CN); Matthew Robert Scott, Beijing (CN); Weipeng Liu, Beijing (CN); Xi Chen, Tianjin (CN); Xi Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 13/635,274

(22) PCT Filed: Jun. 29, 2012

(86) PCT No.: PCT/CN2012/077888
§ 371 (c)(1),
(2), (4) Date: Sep. 14, 2012

(87) PCT Pub. No.: WO2014/000263
PCT Pub. Date: Jan. 3, 2014

(65) Prior Publication Data
US 2015/0121290 A1    Apr. 30, 2015

(51) Int. Cl.
*G06F 17/21* (2006.01)
*G06F 17/30* (2006.01)
*G06F 17/27* (2006.01)
*G06F 3/0482* (2013.01)

(52) U.S. Cl.
CPC ...... *G06F 17/30675* (2013.01); *G06F 3/0482* (2013.01); *G06F 17/2785* (2013.01)

(58) Field of Classification Search
CPC .................................................... G06F 3/0237
See application file for complete search history.

(56) References Cited

U.S. PATENT DOCUMENTS

| 4,931,935 | A | * | 6/1990 | Ohira | G06F 17/271 704/8 |
| 5,995,920 | A | * | 11/1999 | Carbonell | G06F 17/21 704/9 |
| 6,070,140 | A | * | 5/2000 | Tran | G06F 1/3203 704/232 |
| 6,289,301 | B1 | | 9/2001 | Higginbotham et al. | |

(Continued)

OTHER PUBLICATIONS

Jiang et al., "On the Development of Text Input Method—Lessons Learned", retrieved at <<http://arxiv.org/ftp/arxiv/papers/0704/0704.3665.pdf>>, Apr. 2007, 10 pages.

(Continued)

*Primary Examiner* — Scott Baderman
*Assistant Examiner* — Benjamin J Smith
(74) *Attorney, Agent, or Firm* — Drinker Biddle & Reath LLP

(57) ABSTRACT

Some implementations provide techniques and arrangements for semantic lexicon based processing, such as in an input method editor. In some instances, a semantic label may be received that is to be defined for a semantic lexicon and at least a first term may be identified as a positive or negative example of the semantic label. In response, some examples may label at least a second term in the semantic lexicon with the semantic label based at least in part on the identification of the first term as a positive or negative example of the semantic label.

14 Claims, 10 Drawing Sheets

(56) References Cited

U.S. PATENT DOCUMENTS

| | | | |
|---|---|---|---|
| 6,822,585 B1* | 11/2004 | Ni | G06F 3/0237 341/22 |
| 7,383,172 B1* | 6/2008 | Jamieson | G06F 17/2785 704/9 |
| 7,778,816 B2 | 8/2010 | Reynar | |
| 7,925,610 B2* | 4/2011 | Elbaz | G06F 17/30616 706/55 |
| 8,056,007 B2* | 11/2011 | Rupp | G06Q 10/10 715/230 |
| 8,228,292 B1* | 7/2012 | Ruiz | G06F 1/1626 345/156 |
| 8,457,416 B2* | 6/2013 | Liu | G06F 17/30731 382/229 |
| 8,788,261 B2* | 7/2014 | Sikstrom | G06F 17/2785 704/255 |
| 8,996,356 B1* | 3/2015 | Yang | G06F 3/0237 704/1 |
| 9,031,830 B2 | 5/2015 | Ballinger et al. | |
| 9,361,365 B2* | 6/2016 | Sweeney | G06F 17/2785 |
| 2002/0198909 A1 | 12/2002 | Huynh et al. | |
| 2003/0149692 A1* | 8/2003 | Mitchell | G06F 17/30684 |
| 2003/0171913 A1* | 9/2003 | Maxwell, III | G06F 17/271 704/4 |
| 2003/0182279 A1* | 9/2003 | Willows | G06F 3/0237 |
| 2005/0108195 A1 | 5/2005 | Yalovsky et al. | |
| 2006/0088356 A1* | 4/2006 | Jawerth | G06F 1/162 400/472 |
| 2006/0173674 A1 | 8/2006 | Nakajima et al. | |
| 2007/0005343 A1* | 1/2007 | Sandor | G06F 17/30675 704/9 |
| 2007/0060114 A1* | 3/2007 | Ramer | G06F 17/30867 455/418 |
| 2007/0083359 A1* | 4/2007 | Bender | G06F 17/2785 704/9 |
| 2007/0100806 A1* | 5/2007 | Ramer | G06F 17/30905 |
| 2007/0124132 A1* | 5/2007 | Takeuchi | G06F 17/275 704/9 |
| 2007/0156393 A1* | 7/2007 | Todhunter | G06F 17/30719 704/9 |
| 2008/0010274 A1* | 1/2008 | Carus | G06N 99/005 |
| 2008/0115086 A1* | 5/2008 | Rupp | G06Q 10/10 715/810 |
| 2008/0171555 A1* | 7/2008 | Oh | G01C 21/20 455/456.1 |
| 2008/0182598 A1* | 7/2008 | Bowman | G01C 21/26 455/466 |
| 2008/0221878 A1* | 9/2008 | Collobert | G06F 17/2785 704/232 |
| 2008/0266148 A1* | 10/2008 | Chen | G06F 3/023 341/67 |
| 2008/0270120 A1* | 10/2008 | Pestian | G06F 17/2785 704/9 |
| 2008/0275694 A1* | 11/2008 | Varone | G06F 17/2785 704/9 |
| 2008/0313607 A1* | 12/2008 | Yutaka | G06F 3/023 717/108 |
| 2009/0052786 A1* | 2/2009 | Gross | G06K 9/6203 382/209 |
| 2009/0055732 A1* | 2/2009 | Motaparti | G06F 3/0237 715/261 |
| 2009/0083028 A1* | 3/2009 | Davtchev | G06F 17/273 704/9 |
| 2009/0164455 A1* | 6/2009 | Weinberg | G06F 17/2211 |
| 2009/0326919 A1* | 12/2009 | Bean | G06F 17/2775 704/9 |
| 2010/0005086 A1* | 1/2010 | Wang | G06F 3/018 707/E17.014 |
| 2010/0088303 A1* | 4/2010 | Chen | G06F 17/30731 707/706 |
| 2010/0100568 A1* | 4/2010 | Papin | G06F 3/0237 707/794 |
| 2010/0332217 A1* | 12/2010 | Wintner | G06F 17/271 704/9 |
| 2011/0093479 A1* | 4/2011 | Fuchs | G06F 17/271 707/755 |
| 2011/0153324 A1* | 6/2011 | Ballinger | G10L 15/30 704/235 |
| 2011/0153325 A1* | 6/2011 | Ballinger | G10L 15/30 704/235 |
| 2011/0161080 A1* | 6/2011 | Ballinger | G10L 15/30 704/235 |
| 2011/0161081 A1* | 6/2011 | Ballinger | G10L 15/30 704/245 |
| 2011/0202874 A1* | 8/2011 | Ramer | G06F 17/30398 715/810 |
| 2011/0208511 A1* | 8/2011 | Sikstrom | G06F 17/2785 704/9 |
| 2011/0248914 A1* | 10/2011 | Sherr | G06F 3/014 345/156 |
| 2011/0270604 A1* | 11/2011 | Qi | G06F 17/271 704/9 |
| 2011/0285656 A1* | 11/2011 | Yaksick | G06F 3/04883 345/173 |
| 2011/0301941 A1* | 12/2011 | De Vocht | G06F 17/2715 704/9 |
| 2011/0314006 A1* | 12/2011 | Sweeney | G06F 17/2785 707/723 |
| 2011/0316772 A1* | 12/2011 | Zhang | G06F 3/0236 345/156 |
| 2011/0320548 A1* | 12/2011 | Jonsson | G06F 3/0237 709/206 |
| 2012/0016658 A1* | 1/2012 | Wu | G06F 3/018 704/3 |
| 2012/0019446 A1* | 1/2012 | Wu | G06F 3/018 345/168 |
| 2012/0029910 A1* | 2/2012 | Medlock | G06F 3/0237 704/9 |
| 2012/0042022 A1* | 2/2012 | Sheth | H04L 51/32 709/206 |
| 2012/0065963 A1 | 3/2012 | Bangalore et al. | |
| 2012/0117506 A1* | 5/2012 | Koch | G06F 3/04886 715/773 |
| 2012/0166182 A1* | 6/2012 | Ko | G06F 17/276 704/9 |
| 2012/0203541 A1* | 8/2012 | Liu | G06F 17/276 704/8 |
| 2012/0303452 A1* | 11/2012 | Xue | H04L 51/02 705/14.49 |
| 2012/0330669 A1* | 12/2012 | Narayanan | G10L 21/06 704/271 |
| 2013/0018874 A1* | 1/2013 | Qiao | G06F 17/30864 707/723 |
| 2013/0018894 A1* | 1/2013 | Qiao | G06F 17/30719 707/748 |
| 2013/0074076 A1* | 3/2013 | Lindenfeld | G06Q 10/06 718/100 |
| 2013/0096910 A1* | 4/2013 | Stan | G06F 17/2785 704/9 |
| 2013/0132871 A1* | 5/2013 | Zeng | G06F 3/018 715/762 |
| 2013/0141259 A1* | 6/2013 | Hazarika | H03M 7/3059 341/106 |
| 2013/0159277 A1* | 6/2013 | Liu | G06F 17/271 707/709 |
| 2013/0159919 A1* | 6/2013 | Leydon | G06F 3/0236 715/780 |
| 2013/0198623 A1* | 8/2013 | Claux | G06F 3/0481 715/273 |
| 2013/0246322 A1* | 9/2013 | De Sousa Webber | G06N 3/0454 706/18 |
| 2013/0290390 A1* | 10/2013 | Choe | G06F 17/10 708/136 |
| 2013/0325436 A1* | 12/2013 | Wang | G06F 17/2715 704/9 |
| 2014/0143355 A1* | 5/2014 | Berdis | H04L 51/04 709/206 |

(56) References Cited

U.S. PATENT DOCUMENTS

| | | | |
|---|---|---|---|
| 2014/0195621 A1* | 7/2014 | Rao DV | H04L 12/1827 709/206 |
| 2014/0258905 A1* | 9/2014 | Lee | G06F 9/4443 715/770 |
| 2015/0088487 A1* | 3/2015 | Yang | G06F 17/2863 704/3 |
| 2015/0161110 A1* | 6/2015 | Salz | G06F 17/289 704/3 |
| 2015/0169552 A1* | 6/2015 | Yang | G06F 3/0237 704/3 |
| 2015/0186362 A1* | 7/2015 | Li | G06F 17/2223 704/3 |
| 2015/0199332 A1* | 7/2015 | Li | G06F 17/30902 715/264 |

OTHER PUBLICATIONS

Choul-woong, Yeon., "Amharic (Ethiopian) Keyboard Released for iOS (iPhone) by Agerigna", retrieved on Dec. 21, 2015 at <<http://www.koreaittimes.com/print/sotry/43996/amharicethiopian-keyboard-realeased-iosiphone-agerigna>>, Korea IT Times, published Jan. 10, 2015, pp. 1-3.

Ellis, Jack., "Sogou's Assertion of Patents Against Baidu Could be a Landmark in the Evolution of China's IP Market", retrieved on Dec. 21, 2015 at <<http://www.iam-media.com/blog/Detail.aspx?g=a8c43be5-0d30-4fea-a096-36a0d914b130>>, IAM, Oct. 30, 2015, pp. 1-2.

"Entering Text with Word Prediction", retrieved on Jan. 6, 2016 at <<http://www.htc.com/us/support/htc-one-s-t-mobile/howto/315363.html>>, HTC One S (T-Mobile), pp. 1-2.

Goel, Vindu., "Facebook Announces a Payments Feature for Its Messenger App", retrieved on Dec. 17, 2015 at <<http://nyti.ms/1GkgtCH>>, The New York Times, Mar. 17, 2015, pp. 1-4.

Isaac, Mike, et al., "Facebook and Uber Follow Asian Rivals in Plan to Enhance Messenger App", retrieved on Dec. 17, 2015 at <<http://nyti.ms/1P8xU0b>>, The New York Times, Dec. 16, 2015, pp. 1-4.

Isaac, Mike., "Facebook Tests a Digital Assistant for Its Messaging App", retrieved on Dec. 17, 2015 at <<http://bits.blogs.nytimes.com/2015/08/26/facebook-tests-a-digital-assistant-for-its-messaging-app/>>, The New York Times, Aug. 26, 2015, pp. 1-2.

Lardinois, Frederic., "Google Brings More Than 100 Virtual Keyboards, Transliterations and IMEs to Gmail", retrieved on Dec. 21, 2015 at <<http://techcrunch.com/2012/10/09/google-brings-more-than-100-virtual-keyboards-transliterations-and-imes-to-gmail/>>, TechCrunch, Oct. 9, 2012, pp. 1-8.

Wortham, Jenna., "What Silicon Valley Can Learn From Seoul", retrieved on Dec. 17, 2015 at <<http://www.nytimes.com/2015/06/07/magazine/what-silicon-valley-can-learn-from-seoul.html>>, The New York Times, Jun. 2, 2015, pp. 1-6.

Amadeo, "2016 Google Tracker: Everything Google is working on for the next year," retrieved on <<http://arstechnica.com/gadgets/2016/01/2016-google-tracker-everything-google-is-working-on-for-the-new-year/>> (Jan. 8, 2016) (last accessed Mar. 15, 2016) retrieved on Jul. 26, 2016, 4 pages.

Apple, "Chinese Input Method: Use the Pinyin—Simplified Input Source," retrieved at <<https://support.apple.com/kb/PH22620?locale=en_US>> (Sep. 30, 2015) (last accessed Jul. 18, 2016) retrieved on Jul. 26, 2016, 3 pages.

Apple, IOS Developer Library, "Managing the Keyboard," retrieved at <<https://developer.apple.com/library/prerelease/content/documentation/StringsTextFonts/Conceptual/TextAndWebiPhoneOS/KeyboardManagement/KeyboardManagement.html>> (Mar. 10, 2014) (last accessed Jul. 19, 2016) retrieved on Jul. 26, 2016, 9 pages.

Eadicicco, "10 Ways Texting on Your iPhone is About to Change Forever," Time, retrieved at <<http://time.com/4367056/apple-imessage-wwdc-ios-10-iphone/>> (Jun. 14, 2016) (last accessed Jul. 18, 2016) retrieved on Jul. 26, 2016, 4 pages.

Facebook Draft.js, retrieved at <<https://github.com/facebook/draft-js.git>> (last accessed Mar. 24, 2016) retrieved on Jul. 26, 2016, 2 pages.

Google Input Tools—Home, retrieved at <<https://www.google.com/inputtools/>> (last visited Mar. 15, 2016) retrieved on Jul. 26, 2016, 2 pages.

Google Input Tools—Supported Languages, retrieved at <<https://www.google.com/inputtools/help/languages.html>> (last visited Mar. 15, 2016) retrieved on Jul. 26, 2016, 7 pages.

Google Play, "WeChat—Android Apps on Google Plan," retrieved at <<https://play.google.com/store/apps/details?id=com.tencent.mm&referrer=utm_source%3Dwechat.com%26utm_medium%3Ddesktop>> (last visited Jan. 25, 2016) retreieved on Jul. 26, 2016, 3 pages.

MDGB, Enabling pinyin input on your computer, retrieved at <<https://www.facebook.com/notes/mdbg/enabling-pinyin-input-on-your-computer/419757796861/>> (Sep. 4, 2010) (last accessed Mar. 23, 2016) retrieved on Jul. 26, 2016, 2 pages.

Mozur, "Seeking Access to Facebook in China, Zuckerberg Courts Risks," Nytimes, retrieved at <<http://www.nytimes.com/2016/03/21/business/seeking-access-to-facebook-in-china-zuckerberg-courts-risks.html>> (Mar. 20, 2016) (last accessed Mar. 23, 2016) retrieved on Jul. 26, 2016, 3 pages.

Salier-Hellendag, "Facebook open sources rich text editor framework for Draft.js," retrieved at <<https://code.facebook.com/posts/1684092755205505/facebook-open-sources-rich-text-editor-framework-draft-js/>> (Feb. 26, 2016) (last accessed Mar. 23, 2016). retrieved on Jul. 26, 2016, 10 pages.

Sander, "Demo of Weixin/WeChat," (published Apr. 18, 2013) retrieved at <<https://www.youtube.com/watch?v=AvpI0IZjDN8>> (accessed Jan. 24, 2016) retrieved on Jul. 26, 2016, 2 pages.

WeChat, retrieved at <<http://www.wechat.com/en/ . . . (last visited Jan. 25, 2016), retrieved on Jul. 26, 2016, 2 pages.

Weixin, "WeChat—Free messaging and calling app," retrieved at <<http://weixin.qq.com/>> (as translated by google translate. Last visited Jan. 26, 2016) retrieved on Jul. 26, 2016, 3 pages.

* cited by examiner

```
<?xml version="1.0" encoding="utf-8"?>
<ImeExtension xmlns="http://schemas.microsoft.com/ime/extensions/1.0"/>
302
    <Identity>
        <Uid>{9DA5510D-835C-4374-8D23-45A63C24400C}</Uid>
        <Name>_MAPS_</Name>
        <Version>1.0.0.0</Version>
        <Languages L1="zh-CN" L2="en-US"/>
    </Identity>
304
    <LikelihoodQuickCheck>
        312        314
        <InputPrefix score="99" prefix="map"/>
        <InputPrefix score="99" prefix="ditu"/>
                        320      322
        <InputMatch score="90" pattern="^(t:place)ditu$"/>
        <InputMatch score="90" pattern="^(t:place)zaina$"/>    324
        <InputMatch score="70" pattern="^(dao|qu|zai)(t:place)|i$"/>
        <InputMatch score="60" pattern="^(qu|dao|zai)(t:place)$"/>
    </LikelihoodQuickCheck>
306
    <Engine target="Remote"/>
308
    <Display target="RichWindow" xslt="mapDisplayDefault.xsl" minWidth="460" minHeight="120"/>
310
    <Insertion>
        <Scenario name="HTML" xslt="mapInsertHtml.xsl"/>
    </Insertion>
</ImeExtension>
```

FIG. 3

SEMANTIC LEXICON-BASED INPUT METHOD EDITOR

CROSS REFERENCE TO RELATED APPLICATIONS

This application is a 35 U.S.C. 371 National Stage Application of International Application No. PCT/CN2012/077888, filed Jun. 29, 2012, the entire contents of which are incorporated herein by reference.

TECHNICAL FIELD

This disclosure relates to the technical field of computer input.

BACKGROUND

The continued proliferation of computing devices has led to an increase in the availability of applications and other content used on these devices. For instance, users employ a variety of applications, such as word processing applications, business applications, communication applications, games, digital media players, browsers, and numerous other types of applications, on an assortment of computing devices. As the number of computing devices and applications used on these devices continues to increase, users are ever more interested in enhancing their experiences while using these computing devices and applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for semantic lexicon based processing, such as in an input method editor. In some instances, a semantic label may be received that is to be defined for a semantic lexicon and at least a first term may be identified as a positive or negative example of the semantic label. In response, some examples may label at least a second term in the semantic lexicon with the semantic label based at least in part on the identification of the first term as a positive or negative example of the semantic label.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example manifest according to some implementations.

DETAILED DESCRIPTION

Overview

Figure 1:
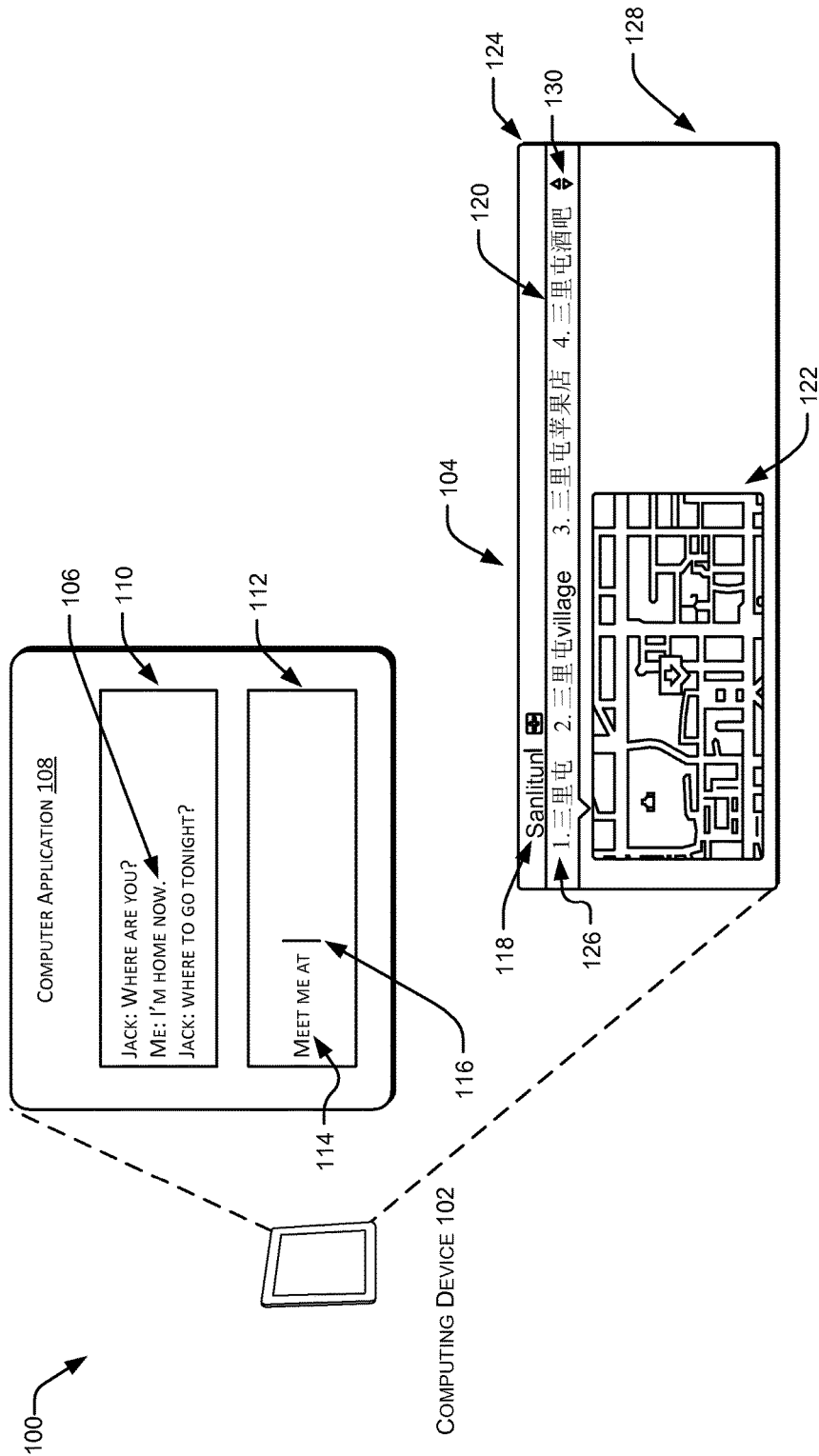
FIG. 1 illustrates an example system according to some implementations.

This disclosure includes techniques and arrangements for semantic lexicon based processing. In some implementations, techniques and arrangements are provided for establishing and using a semantic lexicon with an input method editor (IME) that provides completion candidates to a user for insertion into another computer application. In some examples, an IME may be a computer application that assists a user to input text to a computing device. An IME may provide several completion candidates based on inputs received from the user. The user may then select one or more of the completion candidates and, in response to the selection, the IME inserts the selected completion candidates into another computer application.

In some examples that involve an IME, the disclosed techniques provide an IME that provides candidates to a user to input into a computer application at least partly based on a semantic lexicon and the queries input by the user. In some situations, the candidates may include not only text candidates, such as non-Latin characters, e.g., Chinese, and Latin characters, e.g., English, but also rich candidates, such as multimedia, to provide supplemental information to a user to enhance the user experience.

The queries may be one or more texts such as characters or symbols input by the user. The queries may represent one or more expressions. For example, a query may be a series of initial characters, an abbreviation, a spelling, and/or a translation of one or more words or phrases. The queries and the expressions represented by the queries, such as words or phrases, may be in the same or different languages. The user may input the queries through a variety of input methods such as a keyboard input, a voice input, a touch screen input or a gesture input.

Candidates and their rankings for display positions among multiple candidates may also be generated or identified based on a combination of parameters for a current user input. For example, a same query input by the user into the IME with different semantic lexicons or in different scenarios may have different candidates and/or candidate rankings. In some implementations, the ranking of the candidates may also be different for different users with different semantic lexicon labeling. The scenario of the user input may include a scenario of the computer application (e.g., chatting or emailing). The scenario of the user input may also include a context of the user input (e.g., a prior use history of the computing application such as chatting history or contents displayed at the user interface of the computer application such as the user's prior inputs).

In some implementations, the IME may provide rich candidates in some predefined scenarios of the user input (such as emailing or chatting) and not provide rich candidates in some predefined scenarios of the user input (such as document editing). In another implementation, the IME may provide rich candidates when a probability that a rich candidate is desired by the user is calculated to be beyond a predefined threshold.

There may also be various configurations for the deployment of the IME. In one implementation, all components of the IME are located at a client device. In another implementation, the IME is implemented in a client-server architecture in which some components are located at the client device and some components are located at the remote server relative to the client device.

Example Implementations

FIG. 1 illustrates an example overview 100 of providing text and/or rich candidates in an example chatting scenario in which the IME may use semantic labels of a semantic lexicon to provide candidates.

A user of computing device 102, via a user interface of an input method editor (IME) 104, inputs one or more objects 106 into a user interface of a computer application 108. Both the user interface of the IME 104 and the user interface of the computer application 108 are presented in a user interface of the computing device 102 at a same time. There may be two or more computer applications (not shown in FIG. 1) opened at the user interface of the computing device 102. The user may select the computer application 108 that receives the objects 106 by using a mouse or other inputting methods.

In the example of FIG. 1, the computer application 108 is a chatting application such as Microsoft MSN®. As mentioned above, the user interface of the computer application 108 includes two windows, a chatting window 110 and an input window 112. The chatting window 110 displays the objects 106 which are already input into the user interface of the computer application 108. The objects 106 may include text and/or rich objects. In the example of FIG. 1, the objects 106 are the text objects, "Jack: Where are you? Me: I'm home now. Jack: where to go tonight?" "Me" is a representation of the user of the computing device 102. Jack is a user name of the opposing party that is chatting with the user of computing device 102.

The input window 112 includes input objects 114 that are to be input into the chatting window 110 as objects 106. In the example of FIG. 1, the input objects 114 are the text objects, "Meet me at." An input indication 116, illustrated as "|," represents an indication of the location where completion candidates will be inserted into the input window 112. The input indication 116 may be, for example, focused to that location by a mouse input. The input indication 116 also indicates that the computer application 108 that contains the input indication 116, among many other running computer applications (not shown in FIG. 1), is the one that receives input objects 114 from the IME 104.

The user may use the user interface of the IME 104 to input the input objects 114. In the example of FIG. 1, the user inputs one or more queries 118 into the user interface of the IME 104. The IME 104 returns one or more completion candidates including one or more text candidates 120 and/or one or more rich candidates 122 at least partly based on semantic labeling in a semantic lexicon and the user input. The user may then select one or more completion candidates from the text candidates 120 and/or rich candidates 122 as the input objects 114.

The query 118 and the text candidates 120 may be any kind of text such as Latin characters (e.g. English), non-Latin characters (e.g. Chinese), symbols, numbers, or a mix of different kinds of texts. The query 118 and the text candidates 120 may be the same language or different languages. For example, the query 118 may represent a series of initial characters, an abbreviation, a spelling, and/or a translation of the text candidates 120.

The rich candidates 122 may include pictures, maps, videos, and/or other forms of representations in addition to texts. The rich candidates 122 may include, for example, pictures, maps, videos, or other forms of representations that provide supplemental information to the user in addition to the text candidates 120.

In the example of FIG. 1, the user interface of the IME 104 includes a query window 124, a text candidate window 126, and/or a rich candidate window 128. The query window 124 receives one or more queries 118 from the user through various inputting techniques, such as a keyboard, a touch screen, voice inputs, or gestures.

As mentioned above, to assist in determining the completion candidates to present, the IME may refer to a semantic lexicon as well as collect data relating to the scenario of the user input. Regarding the semantic lexicon, the IME 104 may access a semantic lexicon and determine, among other things, whether the query includes any terms that are semantically labeled within the semantic lexicon, such as a term labeled as a place. Regarding the scenario, the scenario of the user input includes the scenario of the computer application 108, i.e. chatting in FIG. 1. The collected data may include, for example, a name of the computer application 108. The scenario of the user may also include a context of the user input such as the objects 106 already displayed on the chatting window 110 of the computer application 108 and the input objects 114, displayed at the input window 112, to be input into the chatting window 110.

The query 118 in the example of FIG. 1 is the set of Latin characters "Sanlitun," which is a Pinyin spelling of Chinese characters "三里屯." In another implementation, the query 118 may directly show the Chinese characters "三里屯." For instance, the user may speak the letters "S a n l i t u n" into the computing device 102 and the IME directly identifies it as the English spelling of Chinese characters "三里屯" and presents the Chinese characters "三里屯" in the query window 124. In another implementation, the user may speak the word "Sanlitun" into the computing device 102 and the IME 104 directly identifies it as the Chinese word "三里屯" and presents the Chinese characters "三里屯" in the query window 124.

The text candidate window 126 displays identified text candidates 120. In the example of FIG. 1, the text candidates 120 include a first text candidate "三里屯," a second text candidate "三里屯 village," a third text candidate "三里屯苹果店," and a fourth text candidate "三里屯酒吧." The text candidates 120 are Chinese characters and a mix of Chinese and Latin characters corresponding to the query 118. The text candidates 120 include not only the first Chinese text candidate "三里屯" which is the Chinese expression of the spelling "Sanlitun," but also other text candidates such as the second text candidates that include more text information such as "三里屯 village," "三里屯苹果店," and "三里屯酒吧" that may provide more supplemental information to enhance the user experience. The text candidates 120 may be identified at least partly based on a semantic lexicon and the query 118. In the example illustrated in FIG. 1, the term "Sanlitun" is the Pinyin spelling of the name of an area of the Chaoyang District in Beijing, China. As such, the term "Sanlitun" may be labeled as a "place" in the semantic lexicon. The IME 104 may determine what text candidates to provide based on this labeling.

The text candidate window 126 may display more text candidates 120 if the user clicks the button 130 for more text candidates 120.

The rich candidate window 128 displays the identified or generated rich candidates 122. In the example of FIG. 1, based on the semantic label "place" (and any other information used by the IME 104, such as the user's input objects 114, "Meet me at"), the IME 104 determines that the query 118 "Sanlitun" may refer to a location, and the IME 104 may use web services to identify the illustrated rich candidate 122 which is a map of "三里屯." The rich candidates 122 may also include a map with directions from the user's current location to "三里屯" (not shown in FIG. 1).

In some implementations, the web services are online services, such as Bing® map, that do not require a registration of the user to use. The IME 104 may directly use the query 118, semantic labeling and/or the scenario of user input as input parameters to request the web service to return the rich candidates 122. In another implementation, the web service (not shown in FIG. 1) may be online service that require the registration of the user to use, such as Facebook®, or requires the registration of the user to provide more functionality based on prior saved user preference, historic data, etc. The IME 104 may pre-store the authentication credentials of the user to log onto and use such web service.

The user may select one or more of the text candidates 120 and/or rich candidates 122 as input objects 114 to be inserted at the input indication 116.

Figure 2:
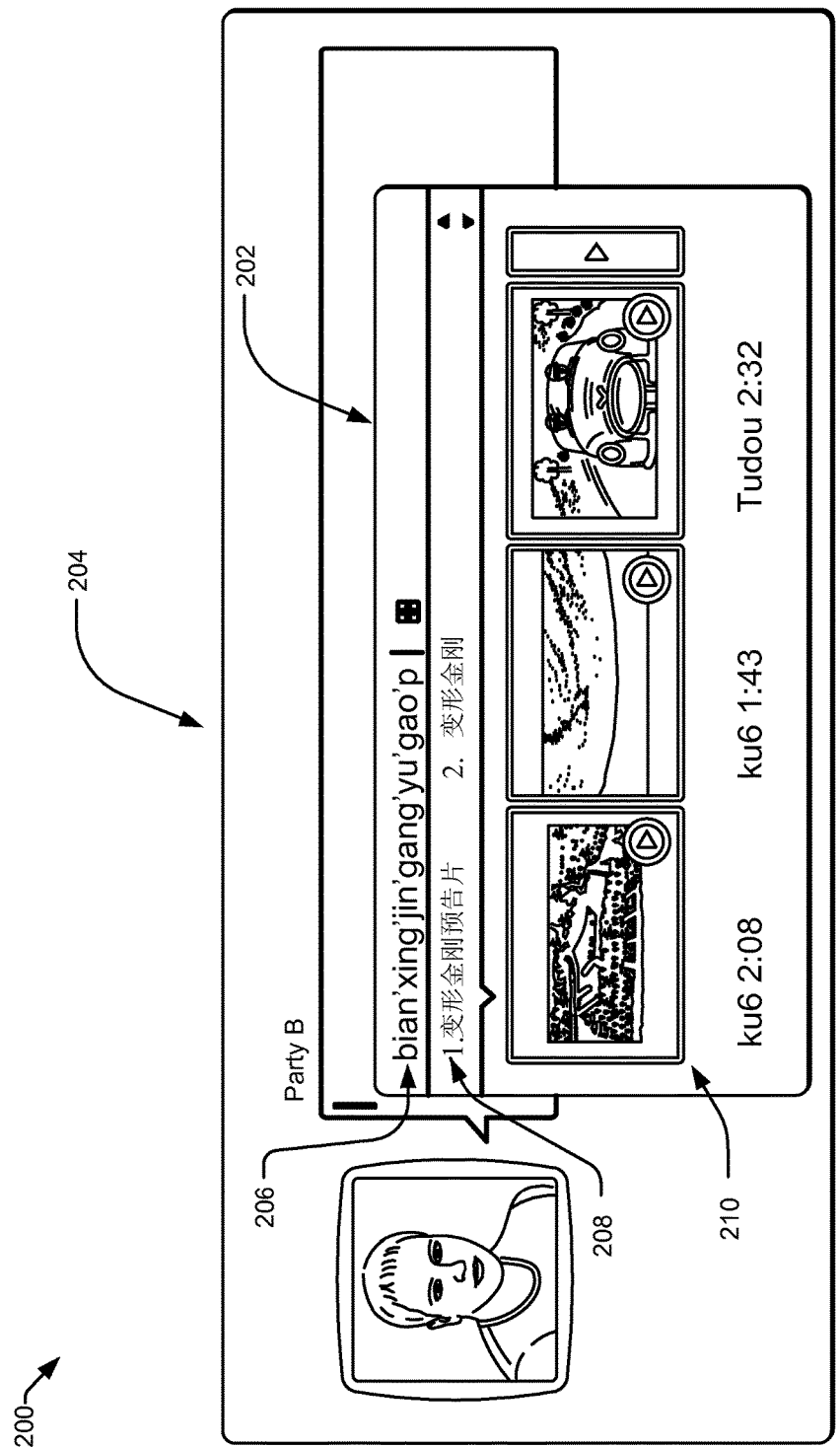
FIG. 2 illustrates an example display according to some implementations.

FIG. 2 illustrates another example 200 in which an input method editor (IME) 202 may use semantic labels of a semantic lexicon to provide text and/or rich candidates in an example chatting scenario.

Specifically, a user is utilizing an IME 202 to input completion candidates into a chatting program 204. In the example shown in FIG. 2, the user has input the text "bian'xing'jin'gang'yu'gao'p" into the query window 206. The query text is a Pinyin spelling of the Chinese phrase "变型金刚预告片" which means "preview of Transformers" in English. The text candidates 208 include two Chinese terms "变型金刚预告片" and "变型金刚" which are ranked according to their relevance to the queries. The Chinese term "变型金刚预告片" is ranked first while the Chinese term "变型金刚" is ranked second.

For the rich candidates, the IME 202 refers to the semantic lexicon and determines that the term "Transformers" is a movie title and that, in combination with the phrase "preview of," there is a high probability that the user is interested in seeing a preview or trailer of the film "Transformers." Based on this determination, the IME 202 may use web video search services, such as those found on web search engines like Microsoft Bing®, to search for videos relating to the film "Transformers." Thus, in FIG. 2, the rich candidates 210 include three videos from different websites such as "Ku6" and "tudou," and each have different parameters such as different video lengths.

Other implementations may not involve an IME, but rather use the semantic lexicon described herein in other programs. It should be understood that, though this disclosure may, for ease of understanding, describes the system and method in the context of an IME, the system and method described herein are not limited to such uses and may be used in many other situations.

The semantic lexicon functionality described herein may be implemented at various levels in the software and hardware of computing systems. Such levels include the Operating System (OS) level, such as in the OS with or without application support, the application level, either separate from OS (i.e. stand-alone) or as a plug-in to the OS or a plug-in to another application and so forth. Further, the semantic lexicon functionality may be implemented universally for all applications, such as in OS only implementations, or the functionality may only be active in select situations, either in specific programs (e.g. a OS level IME), classes of programs (e.g. dedicated IMEs of individual programs), and so forth. Moreover, some implementations may allow a user to set various parameters of the semantic lexicon functionality such as, the class of programs that implement the functionality, the languages, writing systems, and rich candidate types to be used for the functionality and so forth.

In implementations that involve an IME, various application configurations may be installed at the IME. In one example, some applications are installed at the IME in an executable file format. In another example, the IME may use a file in a form of declarative markup language, such as the Extensible Markup Language (XML), to describe one or more characteristics of the one or more applications associated with the IME. The markup language file is human-readable and editable, and is called a manifest or manifest file herein. The manifest file is a self-describing document. It is the starting point when loading a respective application, and is interpreted by the computing system of the IME, such as at a client device and/or a server in a declarative way to enable application behaviors. It is also used to automatically expose configuration information about the respective application. In client-server implementations, the manifest file may reside at both the client and the server components of the computing system of the IME.

The manifest file may include a manifest schema and a manifest. The manifest schema, which is in the form of declarative markup language, describes the manifest features supported by the computing system of the IME. The manifest describes a particular application. The features in the manifest for the particular application shall comply with the specification in the manifest schema. The manifest for the particular application may be an independent file from the manifest schema. Alternatively, the manifests for different applications and the manifest schema may be combined in one manifest file. The manifest schema may expose enumerations for supported scenarios. An application developer of the applications may refer to the manifest schema as a baseline reference to the current capability of the computing system of the IME.

FIG. 3 illustrates an example manifest 300. Manifest 300 is an example XML that define rules of when to trigger "map" candidates. As will be discussed in further detail below, the semantic label "place" is used in particular situations to trigger "map" candidates. The "first tier" elements of manifest 300 include an Identity element 302, a LikelihoodQuickCheck element 304, an Engine element 306, a Display element 308, and an Insertion element 310. It would be understood by one or skill in the art that these names are for example purposes only and any other names could be used. While the focus of FIG. 3 for the purpose of this disclosure is the LikelihoodQuickCheck element 304, a brief discussion of the purpose of the "first tier" elements is provided below.

The Identity element 302 describes an application that is to be used in the case of a rich candidate being triggered. In the example illustrated in FIG. 3, the application is Maps. The Identify element 302 also includes information such as the version of Maps to be used as well as the languages involved. In FIG. 3, the languages are Chinese and English, (set forth as zh-CN and en-US, respectively).

The LikelihoodQuickCheck element 304 provides the probabilities for different combination of parameters such as input and context conditions that the identified application be considered a contender for a given query. Particularly, it may declare or calculate "scores" for different inputs. In short, it has a language for leveraging semantic labeling in a regular expression-like syntax.

The Engine element 306 declares whether the engine of the application is located at the client device, a server device, or both. In the example illustrated in FIG. 3, the Engine element 306 indicates that the engine of the Maps application is to be located at a server (remote) device.

The display element 308 declares how the computing system of the IME will display this particular application. It may take into consideration scenarios of different host applications and describes how to transform the presentation according to the scenarios. In this way, the host application may have influence on how candidates are displayed. In the example illustrated in FIG. 3, the Display element 308 indicates that the Maps application is to be shown in a rich candidates window, such as rich candidates window 128 in FIG. 1 and gives the size parameters for the display.

The insertion element 310 declares how to transform the data from the chosen candidate into a form the host application can accept and declares whether the candidate can be transformed "optimally" into the host application according to the scenario. For example, an email candidate might be transformed into a special email link in an email program, or plain text in a simple note taking program. In the example illustrated in FIG. 3, the scenario of insertion is into an HTML, the insertion element 312 indicates that a XSLT named "mapInsertHTML.xsl" should be used.

Returning to the LikelihoodQuickCheck element 304, FIG. 3 illustrates two example types of scenarios or patterns of input which are used to assign scores that may trigger the use of Maps candidates in the IME candidates window. In short, when the user input matches any of the patterns, a score is accumulated which is later used to judge the likelihood of a particular type of candidates to be shown to the users. The first type is "InputPrefix" and is directed at determining the prefixing of any term with the given pattern. As an example, InputPrefix element 312 assigns a score of 99 percent for any query that is preceded by the prefix 316 "map." For example, if the phrase "map Austin" is input to the IME, the LikelihoodQuickCheck element returns a score of 99 percent for providing a map candidate for "Austin." The second type of LikelihoodQuickCheck sub-element illustrated in FIG. 3 is "InputMatch" elements. InputMatch elements, such as InputMatch element 318, set forth a pattern in a regular expression-like syntax that, if matched, assigns a score to the query. Using pattern 320 as an example, the InputMatch pattern uses semantic labels, such as the semantic label "place," in a manner similar to wildcards in regular expressions. Specifically, as illustrated at 322, a wildcard for the semantic label "place" is set forth as (t:place). In operation, if the IME receives an input that follows a pattern of the form, a term that has the semantic label "place," followed by "ditu" or "zaina," the query will receive a score of 90. Thus, both the term "Austin" and the term "Sanlitun" (assuming both are labeled with the "place" label), followed by either "ditu" or "zaina," will be recognized as a match to the pattern and assigned a score of 90. Further examples of a regular expression-like syntax for using semantic labeling as a wildcard are shown at item 324.

Figure 4:
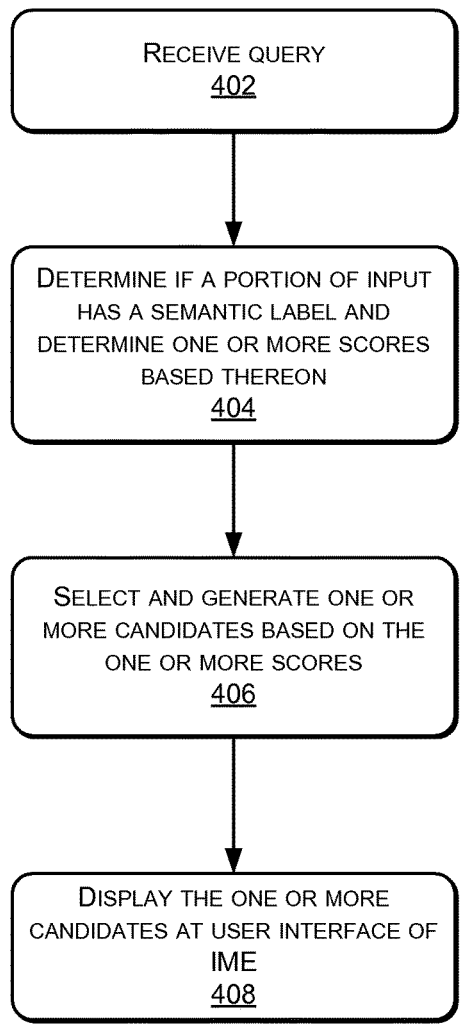
FIG. 4 illustrates an example process flow according to some implementations.

FIG. 4 illustrates an example process flow 400 according to some implementations. In the flow diagrams of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process flow 400 is described with reference to the system shown in overview 100, described above, although other models, frameworks, systems and environments may implement the illustrated process.

At block 402, the IME 104 receives a query including user input. This query could include text entered into the user interface of the IME 104 shown in FIG. 1. The process flow 400 then continues to block 404.

At block 404, the IME 104 determines if the input, or a portion thereof, is a term that has a semantic label. The IME 104 then determines if any manifests, such as that shown in FIG. 3, define patterns that are matched by the query, including matches based on any semantic labels that are ascertained. As discussed above regarding FIG. 3, matches that are found are used to assign indicated scores to different candidate and/or candidate types, such as maps or videos. The process flow 400 then continues to block 406.

At block 406, the assigned scores are used to select candidates for inclusion in the candidates windows 126 and 128. If necessary, the selected candidates are then generated. The process flow 400 then continues to block 408.

At block 408, the selected candidates are displayed at the user interface of the IME 104 for selection by the user and insertion into the computer application 108.

FIGS. 5-9 relate to establishing a semantic lexicon such as that described as being used in the implementations illustrated in FIGS. 1-4. In the example discussed herein, a client-server architecture in which some components are located at a client device and some components are located at a remote server relative to the client device. However, implementations are not limited to such an architecture. For example, all of the processes described could be conducted using a single device. In other implementations, a distributed system or a peer-to-peer architecture could be used. These and other architectures that could be used would be apparent to one of skill in the art in view of the disclosure herein.

Figure 5:
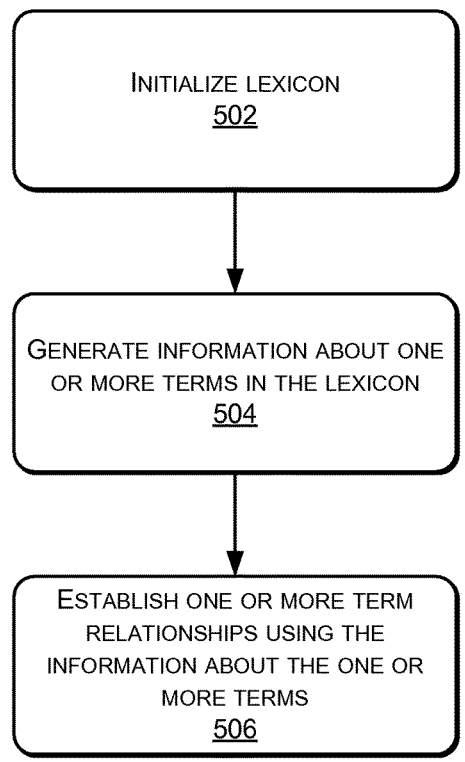
FIG. 5 illustrates an example process flow according to some implementations.

FIG. 5 illustrates an example process flow 500 according to some implementations. In some implementations, the semantic labeling on the server side starts from a raw lexicon, i.e. merely a list of terms without any information. Before conducting labeling, the terms in the lexicon are pre-processed. FIG. 5 illustrates a process flow for pre-processing the raw lexicon, or more particularly, pre-processing the terms in the lexicon to prepare the lexicon for semantic labeling.

At block 502, the lexicon is initialized. In some implementations, initializing the lexicon may involve loading a predefined set of terms to be used in the lexicon. For example, in some implementations, initializing the lexicon may involve loading a large set of terms and processing the set to remove terms which are deemed too common for usage in the lexicon. In other implementations, the initialized lexicon may be a generic list of terms, for example, a list of terms taken from an online dictionary. In still other implementations, the initialization of the lexicon may involve the loading of a set of terms that includes only a specific set of predefined terms. These and other variations on the terms included in the lexicon would be apparent to one of skill in the art in view of this disclosure. Following the initialization of the lexicon, the process flow 500 continues to block 504.

At block 504, information is collected and/or generated about the terms in the lexicon. In some example implementations, this is accomplished by the extraction of rich information for each term in the lexicon from an information source. Many kinds of information and information sources may be used, including structured or semi-structured data available on the Web. For example, the information could be extracted from sources such as the tags assigned to the terms on portal sites, the definitions of the terms in Wikipedia, and statistics for the terms determined based on among a huge collection of documents and/or web pages (such as contextual statistics, i.e. which other term co-occurs with the term for how many times). Once the information is collected or generated, process flow 500 moves to block 506.

At block 506, term relationships are established using the information generated at block 504. In some implementations, given the information about the terms generated in block 504, the relationship between each pair of terms is represented in some mathematical way. For example, if contextual statistics of each term is known from block 504, each term may be represented as a high-dimensional vector where each dimension corresponds to a different word that co-occurs with the term in the same sentence or document. The value assigned to each dimension is the frequency of co-occurrence of the terms. In other implementations, the term relationships may be determined based on how similarly the various terms "behave" in the base material. For example, the terms "Transformers" and "Inception" may be found to "behave" similarly because they are both movie titles. A non-limiting example of "behavior" as used herein is that both terms are found in similar usage contexts in the base material. More concretely, an example could be that, on some web sites, web pages are titled or directed at both "Transformers" and "Inception" in a similar context. In some implementations using a mathematical representation of term relationships, the strength of the relationship between the terms may then be defined as the distance between the two vectors.

It should be noted that there is a large variety of possible definitions and/or implementations of rich information and term relationships that would be apparent to one of skill in the art in view of this disclosure. However, implementations are not limited to any of these definitions and/or implementations.

Figure 6:
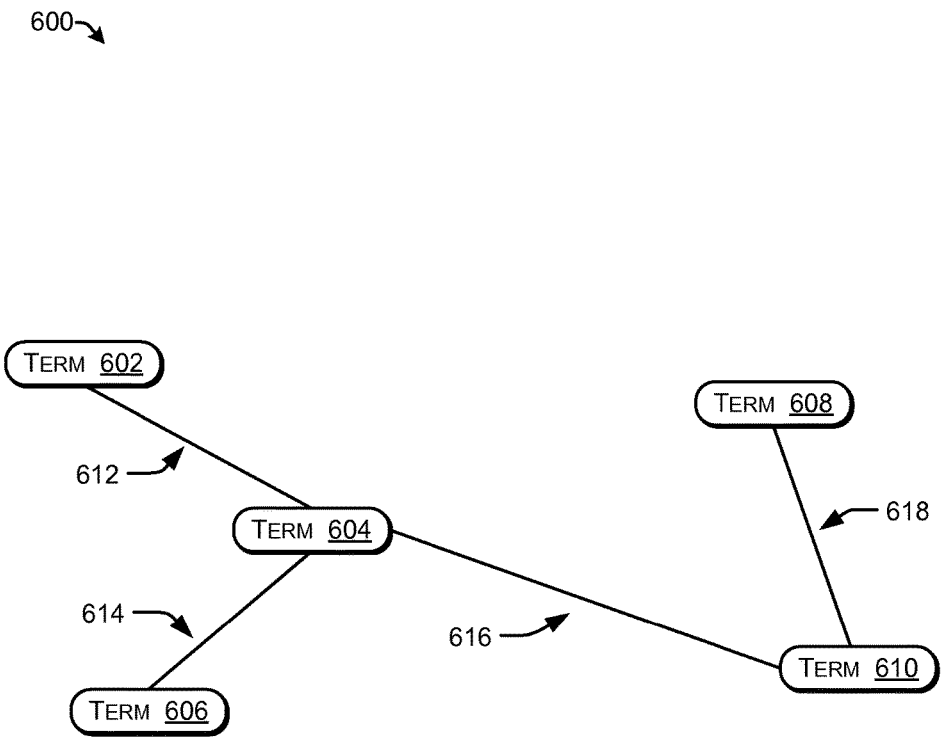
FIG. 6 illustrates an example term relationship graph according to some implementations.

FIG. 6 illustrates an example term relationship map 600 of an example lexicon (or a portion thereof). Specifically, the example term relationship map 600 shown in FIG. 6 includes terms 602, 604, 606, 608 and 610. Based on the information about the terms, the relationships 612, 614, 616, and 618 are established. These relationships will be revisited in the discussion of FIG. 8.

Figure 7:
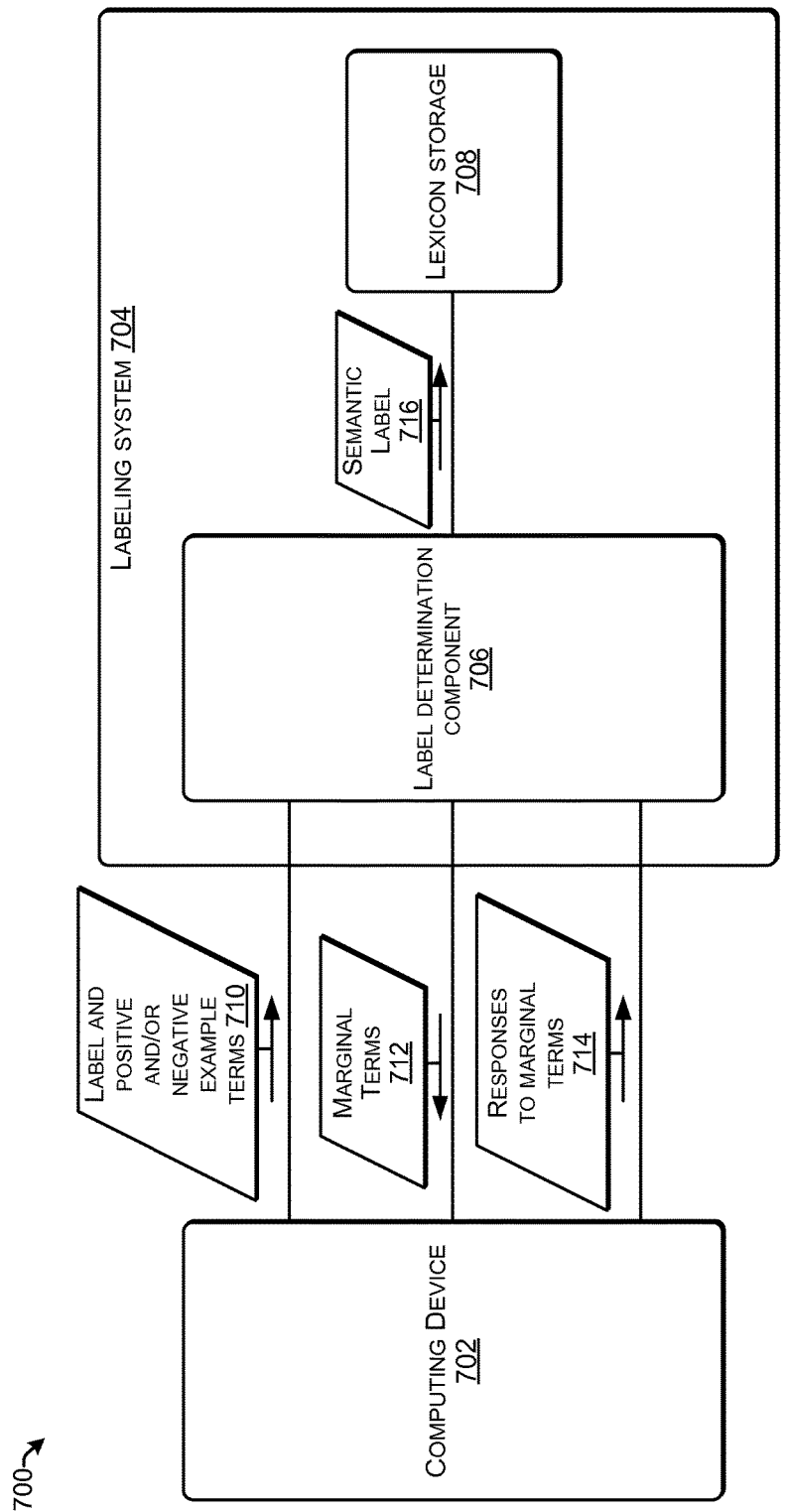
FIG. 7 illustrates an example system according to some implementations.

FIG. 7 illustrates a logical framework 700 of an implementation which includes a computing device 702 and one or more server devices of a labeling system 704 that includes a label determination component 704 and a lexicon storage 708. The computing device 702 and the labeling system 704 communicate across a network to establish the semantic labeling for the lexicon stored in lexicon storage 708. The lexicon stored in lexicon storage 708 could then be used in the implementations discussed above regarding FIGS. 1-4. Further, although the labeling system 704 is shown as a single entity, it should be understood that some implementations include many individual server devices. For example, some implementations may implement the server devices "in the cloud" due to abundant memory and processing power available in such an arrangement. The communication and operation of the computing device 702 and the labeling system 704 for a particular semantic label is illustrated in FIG. 7. These operations occur after the establishment of the lexicon discussed above regarding FIGS. 5 and 6.

Initially, a user provides a semantic label that is to be defined as well as a number of words, which are indicated as positive and/or negative examples of the label, to a client side user interface displayed by computing device 702. The semantic label and the examples are then submitted to the server side labeling system 704. This disclosure uses the terms positive and negative with respect to semantic labeling. Though not limited to such, an example of a concrete "positive" label is the labeling of "Austin" as a place. An example of a concrete "negative" label is the negative labeling of "tablet" regarding the label "place." More simply, this may mean that, "tablet", is not a place. In other words, a non-limiting meaning of a term being a "negative example" or "negatively labeled" herein is that the term does not "fit" within the label or is not correctly described by the label. Combining this, the term "Transformers" may have a positive labeling for the label "movie" but a negative labeling for the label "place." Thus, "Transformer" is a "movie" but not a "place." These examples and other variations would be apparent to one of skill in the art in view of this disclosure.

Based on the received label and examples, the label determination component 706 of the labeling system 704 labels other terms in the lexicon 708. The label determination component 706 also identifies those terms which are difficult to be labeled (i.e. marginal terms).

In some implementations, given the user-provided example terms, the labeling system operates to positively and negatively label other terms as based on the distance between the terms and the user-provided examples. Terms which are "closer," for example, in the aforementioned term relationship map 600, to the user-provided positive example terms than the negative example terms will be labeled with the concerned semantic label. Those terms which are closer in the term relationship map to the user-provided negative example terms than the positive ones will be labeled as negative with regard to the concerned semantic label. In some implementations, the "closeness" between a term and the positive examples may be defined as the average of the distance between the term and each positive example. Similarly, the "closeness" between a term and the negative examples may be defined as the average of the distance between the term and each negative example. The degree of "closeness" that is defined as closer to positive examples as opposed to negative examples need not be measured equally. In other words, for a term to be labeled positively with respect to the label, it may have to be, for example, twice as "close" to the positive example terms as it is to the negative example terms in the aforementioned term relationship map 600.

As mentioned above, the label determination component 706 also identifies marginal terms. A marginal term may be a term where there is no significant difference between its distance from positive examples and its distance from negative examples. Upon determining the lack of a significant difference, the term may be selected as a marginal term. The label determination component 706 then sends the marginal terms 712 along with a tentative labeling of each to the computing device 702.

In response to receiving the marginal terms 712, the computing device 702 presents the marginal terms to the user along with the tentative labels. The user then confirms or negates the tentative labels. The user's responses for the marginal terms 714 are then submitted to the labeling system 704.

The process of labeling, including the identification of marginal terms, then obtaining user feedback for the marginal terms, is iterated until, for example, either the user explicitly terminates the process, the labeling system 704 finds that the user has confirmed some percentage or other number of the tentative labels, or there are no marginal terms remaining. In a particular example, the iterations may continue until the labeling system 704 determines that the label is "stable." Such a stability determination could be based on the percentage of recently submitted tentative labels confirmed as correct by the user.

The labeling system then outputs the completed semantic label 716 to the lexicon storage 708 for incorporation into the lexicon. While shown as being performed upon completion for the establishment of a semantic label, the incorporation of the new semantic label may be performed in parallel with the process of establishing of the label.

Some modules of the labeling system 704 may be implemented as separate systems and their processing results can be used by the labeling system 704. For the sake of convenient description, the above functionally is divided into various modules which are separately described. When implementing the disclosed system, the functions of various modules may be implemented in one or more instances of software and/or hardware. Further, as mentioned above, the functionality need not be divided into a client-server architecture and may be, for instance, performed on a single device such as computing device 102.

Figure 8:
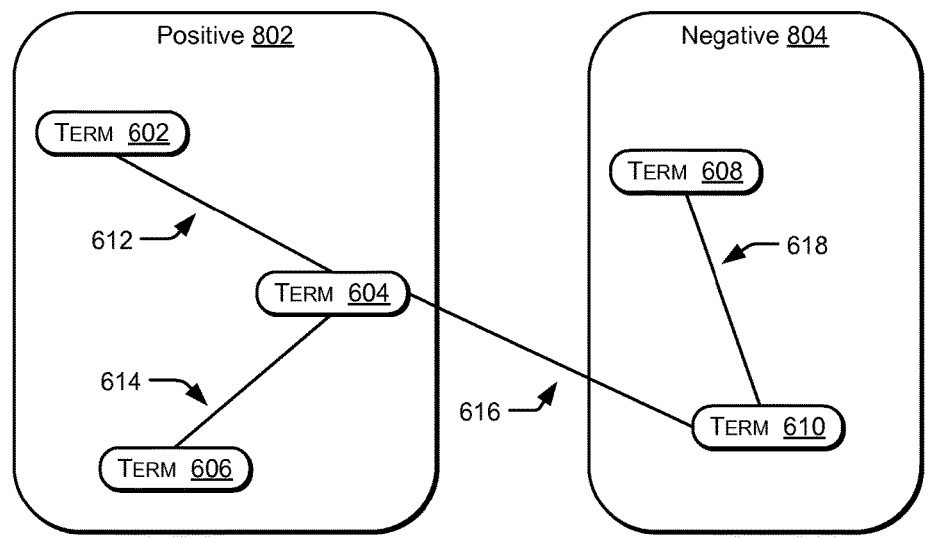
FIG. 8 illustrates an example term relationship graph according to some implementations.

FIG. 8 illustrates the example term relationship map 600 following the addition of groupings that indicate positive and negative labeling. Consider for example that the user provided a label and indicated that term 604 is a positive example of the label and that term 608 is a negative example for the label. Using these examples, the label determination component 706 determines that terms 602 and 606 are both closer to term 604 than to term 608. As such, terms 602, 604, and 606 are grouped into the positive group 802. On the other hand, the label determination component 706 finds that term 610 is not significantly closer to either term 604 or term 608. As such, the label determination component 706 provides a tentative label of term 608 as a negative example of the label and forwards this tentative labeling to the computing device 702 for the user to confirm or negate. In the current example, the user has confirmed the tentative negative labeling, and, as such, terms 608 and 610 are grouped into the negative group 804.

Figure 9:
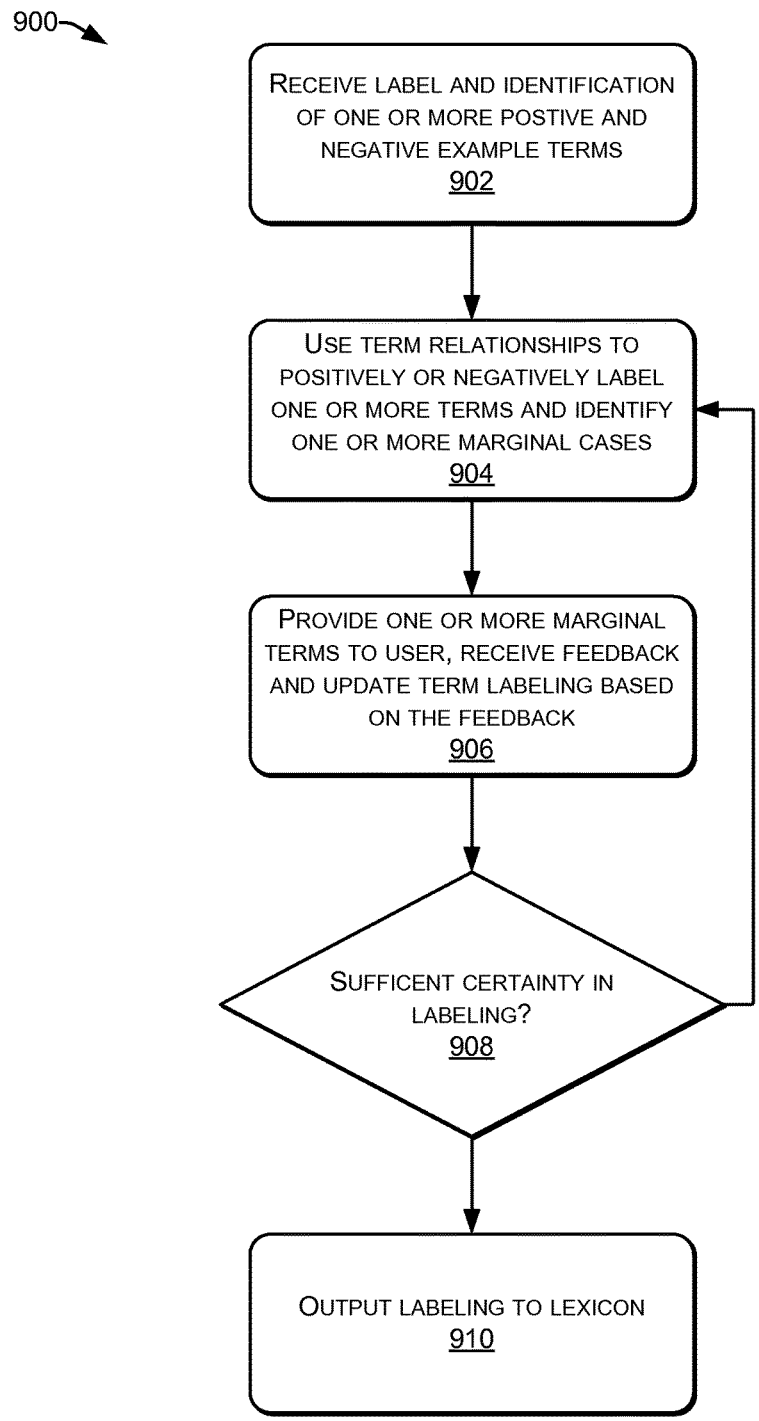
FIG. 9 illustrates an example process flow according to some implementations.

FIG. 9 illustrates an example process flow 900 according to some implementations. For discussion purposes, the process flow 900 is described with reference to the framework 700, described above, although other models, frameworks, systems and environments may implement the illustrated process.

At block 902, the labeling system 704 receives a semantic label to be defined as well as positive and negative example terms for the label. For ease of comprehension, consider the aforementioned case of the user providing a label for the lexicon of FIGS. 6 and 8 and indicating that term 604 is a positive example of the label and that term 608 is a negative example for the label. The process flow then continues to block 904.

At block 904, using term relationships, the labeling system 704 identifies other positive and negative terms in the lexicon with respect to the semantic label. The labeling system 704 also identifies marginal terms. For ease of comprehension, consider the aforementioned case of the label determination component 706 determining that term 602 and term 606 are both closer to term 604 than to term 608. As such, terms 602 and 606 labeled positively regarding the label. On the other hand, the label determination component 706 finds that term 610 is not significantly closer to either term 604 or term 608. This may be conducted in the manner discussed above with regard to FIG. 7. The process flow then continues to block 906.

At block 906, the marginal terms are provided to the user of computing device 702 and feedback for the marginal terms is received. Using the feedback, the term labeling is updated. Referring to the example of FIG. 8, term 610 is provided to computing device 702 with a tentative negative labeling and feedback is received. Though not shown in FIG. 8, upon receiving the feedback, the term relationships may be reexamined for other marginal terms and, if the now confirmed tentative labeling of term 608 results in the other marginal term being clearly positive or negative regarding the label, this labeling is updated and the marginal status is removed from that term. The process flow then continues to block 908.

At block 908, the labeling system 704 determines whether a sufficient level of certainty has been obtained for the label. As discussed above, in some implementations, this may determined based on the number of marginal terms that remain unlabeled or the percentage of tentative labels being confirmed by the user. Other metrics could also be used to determine when sufficient certainty has been achieved for the semantic label. If sufficient certainty has been reached, the process flow continues to block 910. Otherwise, the process flow returns to block 904.

At block 910, the label determination component 706 outputs the semantic label in its complete form to the lexicon storage 708. The process flow 900 is then complete and the semantic label is ready for use.

The semantic lexicon which is generated by the implementations illustrated in FIGS. 5-9 can be used in many ways by, for example, an input method editor (IME). In some implementations, the semantic lexicon is processed to prepare it for usage by, for example, an input method editor IME. One example implementation follows.

First, a minimal perfect hash function (MPHF) may be generated for the semantic lexicon. A MPHF provides a one-to-one mapping from each lexicon term to a corresponding integer without collision (i.e. from 0 to lexicon_count−1). The MPHF is then stored.

Second, the semantic lexicon is stored in a semantic lexicon file, SXF. Some implementations may use length-prefix strings to represent variant-length words in the semantic lexicon. In such implementations, the terms may be stored in the lexicon file as a sequence of Length (in binary)+words (in text). In some of these implementations, the offset of each term in the lexicon file may also be stored in an extra index file.

Third, the semantic labelings are stored in a semantic label file. There are many ways that the semantic labelings can be stored. Two examples are the use of length-prefix labels and the use of a fixed-size bitmap. The use of length-prefix labels is the same type of storage as discussed above regarding the semantic lexicon file. For the use of a fixed-size bitmap, if semantic labels of each term are predefined, then a bitmap can be created for each term. If the term belongs to a label, the corresponding bit will be set to 1. Otherwise, the bit will be set to 0.

In some implementations, all semantic label files share the same semantic lexicon file. Each semantic label file is assigned a unique ID. In operation, the IME client will use the unique ID to refer to the right semantic label file.

Having processed the semantic lexicon in the manner described above, the IME is now ready to use the semantic label of the semantic lexicon. Specifically, to use the semantic lexicon, at startup, the IME may load the MPHF data to construct the perfect hash function and then map the semantic lexicon file and the semantic label files to memory using file mapping technology. During operation, if the user or the IME wants to check the labels of a give word, the IME will use the MPHF to get the index of the word and then use the index to locate and return the semantic labels given in the semantic lexicon file.

While several examples have been illustrated herein for discussion purposes, numerous other configurations may be used and thus implementations herein are not limited to any particular configuration or arrangement. For example, as previously mentioned, the functionality provided by the disclosed techniques and arrangements are not limited to input method editors.

The discussion herein refers to data being sent and received by particular components or modules system. This should not be taken as a limitation as such communication need not be direct and the particular components or module need not necessarily be a single functional unit. For example, the label determination component 706 and lexicon storage 708 are discussed as separate logical components of the system which carry out separate functions and communicate with each other. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

The processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed. The processes illustrated herein are shown as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed.

Example Computing Device and Environment

Figure 10:
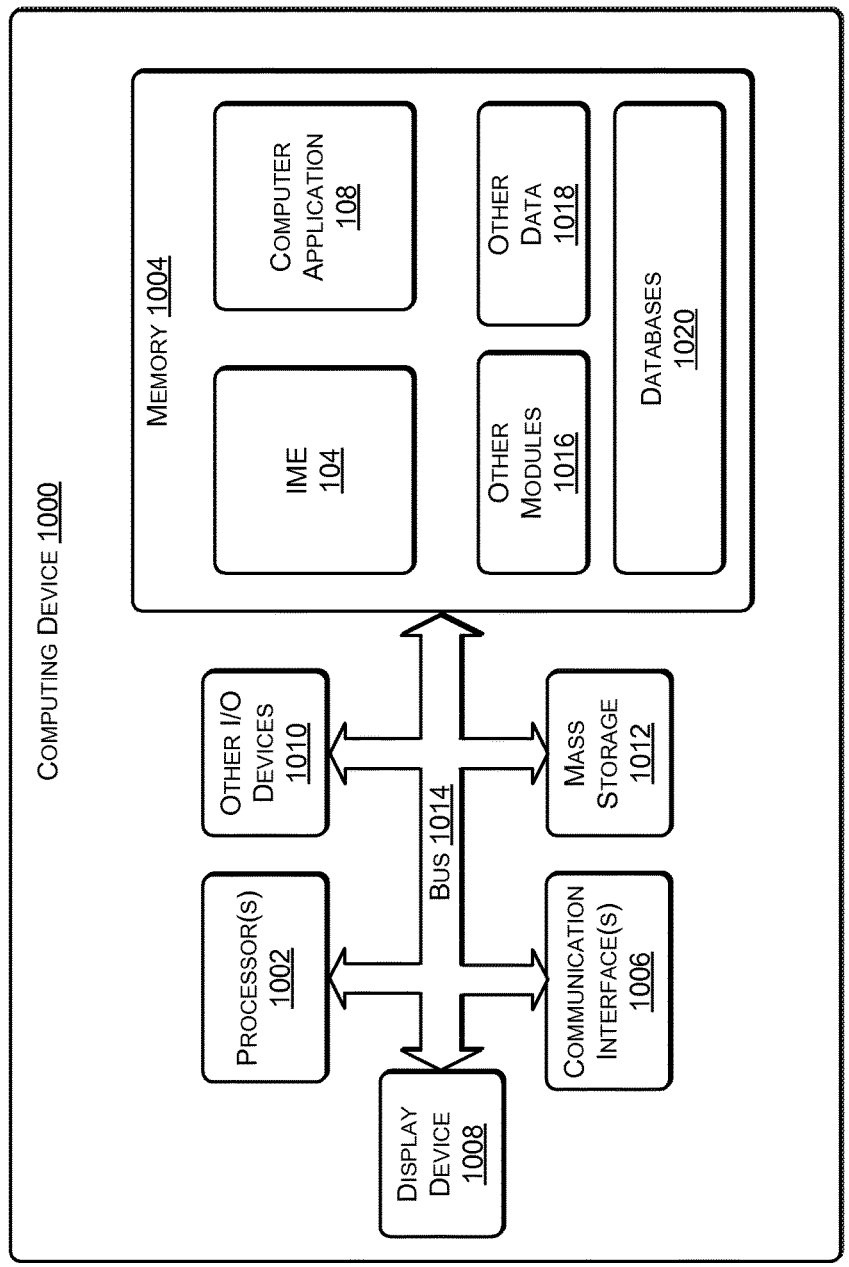
FIG. 10 illustrates an example system in which some implementations may operate.

FIG. 10 illustrates an example configuration of a computing device 1000 and an environment that can be used to implement the modules and functions described herein. As shown in FIG. 10, the computing device 1000 corresponds to the computing device 102 but it should be understood that the computing device 702 and labeling system 704 may be configured in a similar manner to that illustrated.

The computing device 1000 may include at least one processor 1002, a memory 1004, communication interfaces 1006, a display device 1008 (e.g. a touchscreen display), other input/output (I/O) devices 1010 (e.g. a touchscreen display or a mouse and keyboard), and one or more mass storage devices 1012, able to communicate with each other, such as via a system bus 1014 or other suitable connection.

The processor 1002 may be a single processing unit or a number of processing units, all of which may include single or multiple computing units or multiple cores. The processor 1002 can be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions stored in the memory 1004, mass storage devices 1012, or other computer-readable media.

Memory 1004 and mass storage devices 1012 are examples of computer storage media for storing instructions which are executed by the processor 1002 to perform the various functions described above. For example, memory 1004 may generally include both volatile memory and non-volatile memory (e.g., RAM, ROM, or the like). Further, mass storage devices 1012 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be capable of storing computer-readable, processor-executable program instructions as computer program code that can be executed by the processor 1002 as a particular machine configured for carrying out the operations and functions described in the implementations herein.

The computing device 1000 may also include one or more communication interfaces 1006 for exchanging data with other devices, such as via a network, direct connection, or the like, as discussed above. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like. Communication interfaces 1006 can also provide communication with external storage (not shown), such as in a storage array, network attached storage, storage area network, or the like.

A display device 1008, such as a touchscreen display or other display device, may be included in some implementations. Other I/O devices 1010 may be devices that receive various inputs from a user and provide various outputs to the user, and may include a touchscreen, such as touchscreen display, a keyboard, a remote controller, a mouse, a printer, audio input/output devices, and so forth.

Memory 1004 may include modules and components for the computing device 1000 according to the implementations discussed herein. In the illustrated example, memory 1004 includes the IME 104 and the computer application 108 as described above with regard to FIG. 1. Memory 1004 may further include one or more other modules 1016, such as an operating system, drivers, application software, communication software, or the like. Memory 1004 may also include other data 1018, such as data stored while performing the functions described above and data used by the other modules 1016. Memory 1004 may also include other data and data structures described or alluded to herein. For example, memory 1004 may include information that is used in the course of determining completion candidates such as the collocation information for ranking completion candidates as described above.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 10 as being stored in memory 1004 of computing device 1000, the IME 104 and the computer application 108, or portions thereof, may be implemented using any form of computer-readable media that is accessible by computing device 1000. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A computing system comprising:
one or more processors; and
one or more computer readable media maintaining instructions that, when executed by the one or more processors, cause the one or more processors to perform acts comprising:
displaying a user interface of an application including an input area;
displaying a keyboard comprising a plurality of keys corresponding to input characters;
receiving, in a query window of an input method editor (IME), a query comprising one or more Latin input characters corresponding to one or more keys of the keyboard;
identifying a plurality of text candidates based on i) the query, ii) a semantic label of the of each text candidate of the plurality of text candidates in a semantic lexicon, iii) an assigned score based at least in part on the semantic label, and iv) a manifest defining a pattern to be matched by the query, each text candidate of the plurality of text candidates comprising non-Latin characters, and the semantic lexicon comprising a list of terms, information about the terms, and term relationships, wherein the assigned score is based at least in part on a matching of the query with the pattern, and wherein the semantic label acts as a wildcard in the pattern such that terms labeled with the semantic label in the semantic lexicon match a portion of the pattern corresponding to the semantic label;
identifying at least one rich candidate based on a first semantic label of a first text candidate of the plurality of text candidates in the semantic lexicon and based on an input into the input area of the application;
displaying, in a text candidate window of the IME, the plurality of text candidates; and displaying, in a rich candidate window of the IME, the at least one rich candidate, wherein the at least one rich candidate includes at least one of a video and a map based on the first semantic label of the first text candidate, wherein the query window, the rich candidate window, and text candidate window are displayed adjacent to each other in the IME.

2. The computing system as recited in claim 1, wherein the acts further comprise:

receiving an indication of at least one text candidate or rich candidate being displayed to insert into the input area of the application; and inserting the indicated at least one text candidate or rich candidate into the input area of the application.

3. The computing system as recited in claim 1, wherein the at least one text candidate or rich candidate identified based on the semantic label is of a candidate type selected based on the semantic label.

4. The computing system as recited in claim 1, wherein the pattern includes a portion prefixing or post-fixing the portion of the pattern corresponding to the semantic label.

5. The computing system of claim 1, the operations further comprising:

collecting data related to an input scenario; and wherein identifying the plurality of text candidates and rich candidates is further based at least in part on the input scenario.

6. One or more computer storage media maintaining instructions that, when executed by one or more processors, cause the one or more processors to perform acts comprising:

receiving, in a query window of an input method editor (IME), a query comprising one or more Latin input characters, the IME to insert a completion candidate of one or more completion candidates into an input area of an application;

assigning a semantic label to one or more portions of the query using a semantic lexicon;

determining an expected completion candidate type based at least in part on the semantic label assigned to the one or more portions of the query;

generating a plurality of text candidates of based on i) the query, ii) the assigned semantic label, iii) the semantic lexicon, iv) the expected completion candidate type, v) an assigned score based at least in part on the assigned semantic label, and vi) a manifest defining a pattern to be matched by the query, each text candidate of the plurality of text candidates comprising non-Latin characters, wherein the assigned score is based at least in part on a matching of the query with the pattern, and wherein the assigned semantic label acts as a wildcard in the pattern such that terms labeled with the assigned semantic label in the semantic lexicon match a portion of the pattern corresponding to the assigned semantic label;

generating at least one rich candidate based on a first semantic label of a first text candidate of the plurality of text candidates in the semantic lexicon and based on an input into the input area of the application;

displaying, in a text candidate window of the IME, the plurality of text candidates; and displaying, in a rich candidate window of the IME, the at least one rich candidate, wherein the at least one rich candidate includes at least one of a video and a map based on the first semantic label of the first text candidate, wherein the query window, the rich candidate window, and text candidate window are displayed adjacent to each other in the IME.

7. One or more computer readable media as recited in claim 6, the acts further comprising:

receiving a selection of at least one text candidate or rich candidate; and inserting the at least one selected text candidate or rich candidate into the input area of the application.

8. One or more computer readable media as recited in claim 6, wherein the determining of the semantic label using the semantic lexicon includes using a minimal perfect hash function to determine a semantic labeling of at least one portion of the query.

9. One or more computer readable media as recited in claim 6, wherein the determining of the semantic label using the semantic lexicon includes using a fixed size bitmap indicating a semantic labeling of at least one portion of the query.

10. A method comprising:

under control of one or more processors:

receiving, in a query window of an input method editor (IME), a query comprising one or more Latin input characters corresponding to one or more keys of a keyboard;

determining a label of one or more portions of the query using a semantic lexicon comprising a list of terms, information about the terms, and term relationships;

generating a plurality of text candidates comprising non-Latin characters based on i) the determined label of the one or more portions of the query, ii) an assigned score based at least in part on the label, and iii) a manifest defining a pattern to be matched by the query, wherein the assigned score is based at least in part on a matching of the query with the pattern, and wherein the label acts as a wildcard in the pattern such that terms labeled with the label in the semantic lexicon match a portion of the pattern corresponding to the label;

generating at least one rich candidate based on a first semantic label of a first text candidate of the plurality of text candidates in the semantic lexicon and based on an input into the input area of the application;

displaying, in a text candidate window of the IME, the plurality of text candidates; and displaying, in a rich candidate window of the IME, the at least one rich candidate, wherein the rich candidate includes at least one of a video and a map based on the first semantic label of the first text candidate, wherein the query window, the rich candidate window, and text candidate window are displayed adjacent to each other in the IME.

11. The method as recited in claim 10, further comprising:

receiving a selection of at least one text candidate or rich candidate; and inserting the at least one selected text candidate or rich candidate into the input area of the application.

12. The method as recited in claim 10, wherein the determining of the label using the semantic lexicon includes using a minimal perfect hash function to determine the semantic labeling of at least one portion of the query.

13. The method as recited in claim 10, wherein the determining of the label using the semantic lexicon includes using a fixed size bitmap indicating the semantic labeling of at least one portion of the query.

14. The method as recited in claim 10, wherein the generating the plurality of text candidates and rich candidates includes determining one or more types of the plurality of text candidates and rich candidates to generate based on a manifest defining a pattern to be matched by the query, the label acting as a wildcard in the pattern such that terms labeled with the label in the semantic lexicon match a portion of the pattern corresponding to the label.

\* \* \* \* \*